United States Patent [19]
Gleim et al.

[11] Patent Number: 5,146,528
[45] Date of Patent: Sep. 8, 1992

[54] CABLE FOR CONDUCTING SIMULTANEOUSLY ELECTRICITY AND LIGHT

[75] Inventors: Günter Gleim; Siegfried Quandt, both of Villingen-Schwenningen, Fed. Rep. of Germany

[73] Assignee: Deutsche Thomson-Brandt GmbH, Villingen, Fed. Rep. of Germany

[21] Appl. No.: 499,258

[22] PCT Filed: Dec. 12, 1988

[86] PCT No.: PCT/EP88/01143

§ 371 Date: Jun. 18, 1990

§ 102(e) Date: Jun. 18, 1990

[87] PCT Pub. No.: WO89/05988

PCT Pub. Date: Jun. 29, 1989

[30] Foreign Application Priority Data

Dec. 24, 1987 [DE] Fed. Rep. of Germany ....... 3744125

[51] Int. Cl.$^5$ ................................................. G02B 6/44
[52] U.S. Cl. ....................................... 385/101; 385/100
[58] Field of Search ................ 350/96.2, 96.21, 96.23; 385/100, 101, 102, 103–114, 125

[56] References Cited

U.S. PATENT DOCUMENTS 3,399,012  8/1968  Peters .................................. 385/125
4,547,774 10/1985  Gould .............................. 350/96.2 X
4,681,398  7/1987  Bailey et al. ...................... 350/96.2
4,768,860  9/1988  Tatsukami et al. ........... 350/96.23 X
4,919,505  4/1990  Bartosiak et al. ............ 350/96.23 X
4,969,706 11/1990  Hardin et al. .................... 350/96.23

Primary Examiner—John D. Lee
Assistant Examiner—Phan T. Heartney
Attorney, Agent, or Firm—Max Fogiel

[57] ABSTRACT

A cable (K) comprises at least one lead (A) and at least one insulating layer (I). In communication technology, communications are transmitted between two apparatuses by cables of various types. In order to reduce to a minimum the number of cables and cable connections necessary, cables with a high transmission capacity are preferred. In order to substantially increase the transmission capacity of a cable (K) with at least one lead (A) and at least one insulating layer (I), the insulating layer (I) is made for optical transmission purposes of an optically conductive material. Optical transmission channels can be obtained using optically conductive materials for the insulating layers of all cables with one or more insulating layers, for example flat cables, coaxial cables, mains cables, etc., without having to increase the cross-section of the cable or to provide separate connections for additional cables in the appliances to be connected.

8 Claims, 1 Drawing Sheet

5,146,528

CABLE FOR CONDUCTING SIMULTANEOUSLY ELECTRICITY AND LIGHT

BACKGROUND OF THE INVENTION

The invention concerns a cable with at least one core and at least one layer of insulation Electric cable is employed is almost every field of technology. Antenna signals for example are forwarded to receivers, television or radio receivers for example, by way of coaxial cable. Telephone communications are no longer conceivable without coaxial cable. In this area in particular, however, coaxial cable is being increasingly replaced with optical cable, which features an essentially more extensive band width and lower attenuation, because light is a form of energy that requires no shielding, and because the crosstalk that is so irritating with coaxial cable does not occur at all with optical.

Many types of equipment, television sets and video recorders for example, are designed only for coaxial cable. The video signal is transmitted from the recorder to the television set over a coaxial cable. To operate a combination television set and video recorder, however, it is of advantage to transmit control signals in addition to video and audio signals between the two units. Due to the narrow band width and especially due to the distortions occasioned in the video signal and the extreme difficulty of separating the video signal from the audio signal inside the equipment it is not advisable to transmit control signals over the coaxial cable along with the video signals. One of skill in the art is accordingly compelled to provide a separate line to transmit the control signals, which is undesirably expensive. The separate components in other types of consumer electronics-- high-fidelity sets with record players, compact-disk players, radio receivers, audio-cassette recorders, and amplifiers for example-- are connected by simple cable. When control signals must be transmitted along with music and speech, a separate line is also necessary for the aforesaid reasons.

SUMMARY OF THE INVENTION

The object of the present invention is accordingly to provide a means of transmitting information between two pieces of equipment connected by a cable without a separate line and without detriment to the transmission over the cable of either the information or the energy.

This object is attained in accordance with the invention, a cable with at least one core and at least one layer of insulation, in that the layer of insulation is made of optically conductive material and transmits the information optically.

BRIEF DESCRIPTION OF THE DRAWINGS

The invention will now be described with reference to the drawings, wherein.

DESCRIPTION OF THE PREFERRED EMBODIMENTS

Figure 1:
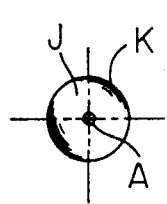
FIG. 1 is a transverse section through a singlecore cable in accordance with the invention.

FIG. 1 is a transverse section through a single-core cable K in accordance with the invention. Its core A is made of wire and extends through a cylindrical, optically conductive layer I of insulation.

Figure 2:
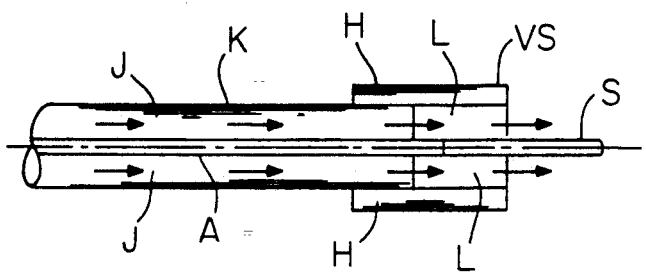
FIG. 2 is a longitudinal section through a cable in accordance with the invention with a connector at one end.

FIG. 2 is a longitudinal section through the cable K illustrated in transverse section in FIG. 1. One end is secured in a connector in the form of a plug VS. The outside of plug VS terminates in a tubular sleeve H that extends partly over cable K Extending along the axis of sleeve H is a pin S that is electrically connected to the core A of cable K. Between pin S and sleeve H is a tubular coupling L with a cross-section that preferably matches the cross-section of the layer I of insulation around cable K. Layer I of insulation can rest against optical coupling L but need not do so, because any space between the two components, although it might attenuate the optical connection, could not interrupt it.

The light, indicated by the arrows, travels from layer I of insulation into optical coupling L, emerges from its face, and enters for example the optical coupling of a jack VB that plug VS fits into and that can for example be accommodated in the housing of a piece of equipment.

Figure 3:
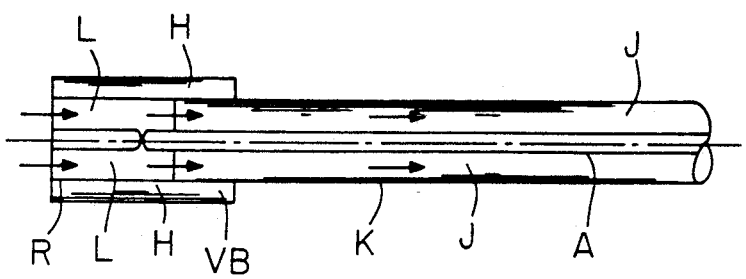
FIG. 3 is a longitudinal section through a cable in accordance with the invention with a connector at one end.

The outside of the jack VB in FIG. 3 terminates in a sleeve H that extends partly over cable K. Extending along the axis of sleeve H is a cylindrical opening R that accommodates the pin S on plug VS and is electrically connected to cable K. Embedded between the cylindrical opening R that accommodates the pin S in plug VS is an also cylindrical optical coupling L. Its cross-section preferably matches that of the layer I of insulation on cable K. As with the plug VS illustrated in FIG. 2, the layer I of insulation on cable K can rest against optical coupling L but need not do so, because any space between the two components could not interrupt the optical connection. The light, indicated by the arrows, leaves the optical coupling L of the plug VS illustrated in FIG. 2 and enters the optical coupling L in jack VB, from the end of which it shines into the layer I of insulation on cable K.

Cable K can be secured in plug VS or jack VB by known, threaded, tension, or soldered connections. The pin S on plug VS is secured in the cylindrical opening R in jack VB by springs or by fitting tight, establish an electric contact between pin S and cylindrical opening R.

When, as illustrated in FIG. 2 for example, the light travels from the transparent layer I of insulation on cable K into optical coupling L, it is of advantage for the cross-section of coupling L to be larger than that of layer I of insulation to ensure that all the light leaving the insulation will be intercepted by the coupling.

If on the other hand the light travels from optical coupling L into the optically conductive layer I of insulation on cable K, it is of advantage for the cross-section of optical coupling L to be smaller than that of layer I to ensure that all the light leaving the coupling will be intercepted by the insulation.

If light is to be transmitted alternately in each direction, however, it will be more effective for the cross-section of optical coupling L to match that of layer I of insulation.

Figure 4:
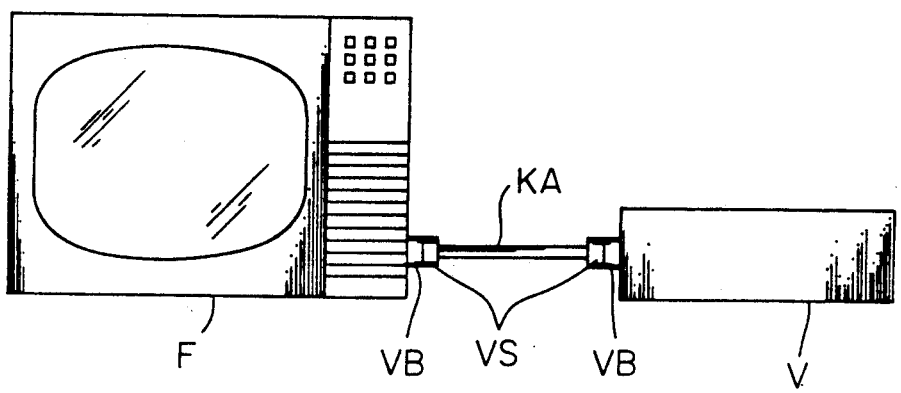
FIG. 4 illustrates an information-transmission system comprising a video recorder, a television set, and a cable in accordance with the invention.

The information-transmission system illustrated in FIG. 4 represents one way of employing the cable in accordance with the invention.

A video recorder V is connected to a television set F by a coaxial cable K with a layer of insulation in the form of a dielectric that conducts light effectively in accordance with the invention. The ends of cable K are secured in plugs VS for example as illustrated in FIG. 2. Mounted on the components—video recorder V and television set F—are jacks VB that match plugs VS, which are also provided with an optical coupling facing the optical coupling L on plug VS. Connected to the end of the coupling in each plug VS opposite plug VS is an optical transmitter and/or receiver. The light from the optical transmitter in whatever component is transmitting travels through the optical coupling in the jack to the optical coupling on the plug, through coaxial cable KA, and through the optical coupling on the plug and the optical coupling in the jack on the receiving component. Both video recorder V and television set F can be provided with an optical transmitter, an infrared-emitting diode for example, and an optical receiver to allow the transmission of information in both directions.

Since the video signals are transmitted electrically and the control signals optically, they have no effect on each other and need not be separated in video recorder V or television set F. Finally, there is no need for two different cables to transmit information, each with a plug at each end and a jack on each component. A single cable is enough.

Another advantage is that optical transmission over the coaxial cable is not interfered with by infrared remote controls.

The cable in accordance with the invention, a combination of electric and optical cable, is not limited to the application described herein. The cable in accordance with the invention can be employed to simultaneously transmit information of any type both electrically and optically between any two components—repeaters, terminals, data banks, etc. for example.

In a ribbon-type cable for example, the individual wires can be insulated with an optically conductive material to provide as many optical-transmission channels as there are wires. Optically conductive insulation can also be employed in power cords and other cables that transmit energy to provide optical channels without increasing the cross-section of the cable. A power or energy cable will accordingly transmit not only electricity but also information of all types without one mode prejudicing the other.

The layer I of insulation around the cable can for example be divided into several mutually optically insulated transmission channels by longitudinal optically insulating intermediate layers to create several information channels without increasing the cross-section of the cable but considerably augmenting its transmission capacity.

If the cable in accordance with the invention is compared with a conventional cable of the same specifications and cross-section, the transmission capacity of the cable in accordance with the invention will be found to considerably exceed that of the known embodiment.

We claim:

1. A cable for conducting simultaneously electricity and light, comprising: at least one electrically conducting core; and at least one layer of insulation surrounding said core; said layer of insulation being comprised of optically conductive material for conducting light therethrough, so that electrical signals can be conducted through said core simultaneously with light signals through said insulation layer; a connector secured to at least one end of said cable and resting against said optically conductive insulation layer for producing an optical coupling; said connector having a portion resting against said insulation layer, said portion being transparent and comprised of optically conductive material or producing an optical transmission channel; said insulation layer being a cylindrically-shaped glass filament having an inside surface, said core being fused to said inside surface; said insulation layer comprising at least two sub-layers; at least one optically insulating intermediate layer between said two sub-layers, said sub-layers being optically conductive.

2. A cable for conducting simultaneously electricity and light, comprising: at least one electrically conducting core for conducting electrical signals in absence of an electrical field; and at least one layer of insulation surrounding said core; said layer of insulation being comprised of optically conductive material for conducting light therethrough, so that electrical signals can be conducted through said core simultaneously with light signals through said insulation layer, said conducting core and said insulation layer being free of an electrical field.

3. A cable as defined in claim 2, including a connector secured to at least one end of said cable and resting against said layer of insulation comprised of optically conductive material, said connector being transparent where said connector rests against said optically conductive layer of insulation to produce an optical coupling.

4. A cable as defined in claim 3, wherein said connector has a portion resting against said optically conductive insulation layer, said portion of said connector being comprised of optically conductive material for producing an optical transmission channel.

5. A cable as defined in claim 2, including an electrically conductive layer surrounding said layer of insulation and being an outer electrical conductor spaced from said core by said insulation layer, so that said cable is a coaxial cable; said insulation layer dielectric and being optically conductive.

6. A cable as defined in claim 5, wherein said insulation layer comprises a cylindrically-shaped glass filament with an inside surface, said core comprising an inner conductor fused to said inside surface of said cylindrically-shaped glass filament.

7. A cable as defined in claim 2, wherein said insulation layer comprises at least two sub-layers to form two optically-insulated transmission channels; and at least one optically insulating intermediate layer located between said two sublayers, said sublayers being comprised of optically conductive material.

8. A cable as defined in claim 2, wherein said cable has a ribbon-shape, a plurality of insulating layers surrounding a plurality of electrically conducting cores and being optically conductive, said optically conductive insulation layers being optically insulated from each other.

* * * * *